(12) United States Patent
Gallmeier et al.

(10) Patent No.: US 11,083,132 B2
(45) Date of Patent: Aug. 10, 2021

(54) HARVESTING DEVICE, CORRESPONDING MACHINE AND METHOD

(71) Applicant: EXEL INDUSTRIES, Epernay (FR)

(72) Inventors: Michael Gallmeier, Ergoldsbach (DE); Bernhard Fuchs, Regensburg (DE)

(73) Assignee: Exel Industries, Epernay (FR)

( * ) Notice: Subject to any disclaimer, the term of this patent is extended or adjusted under 35 U.S.C. 154(b) by 378 days.

(21) Appl. No.: 16/185,310

(22) Filed: Nov. 9, 2018

(65) Prior Publication Data
US 2019/0141885 A1 May 16, 2019

(30) Foreign Application Priority Data
Nov. 10, 2017 (EP) .................................... 17306564

(51) Int. Cl.
*A01D 25/00* (2006.01)
*A01D 33/14* (2006.01)
*A01D 33/00* (2006.01)
*A01D 27/00* (2006.01)

(52) U.S. Cl.
CPC ........... *A01D 25/005* (2013.01); *A01D 25/00* (2013.01); *A01D 33/00* (2013.01); *A01D 33/14* (2013.01); *A01D 27/00* (2013.01)

(58) Field of Classification Search
CPC ........ A01D 33/00; A01D 33/14; A01D 25/00; A01D 25/005; A01D 25/04; A01D 27/00
See application file for complete search history.

(56) References Cited

U.S. PATENT DOCUMENTS

| | | | | |
|---|---|---|---|---|
| 3,326,319 A | * | 6/1967 | Schmidt ................. | A01D 33/00 180/401 |
| 3,461,967 A | * | 8/1969 | Wells ..................... | A01D 33/00 171/8 |
| 3,734,193 A | * | 5/1973 | Molnau ................. | A01D 25/044 171/57 |
| 4,031,962 A | * | 6/1977 | Ellinger ............... | A01B 69/004 171/8 |

(Continued)

FOREIGN PATENT DOCUMENTS

EP 1929852 A1 6/2008
FR 2800233 A1 5/2001

OTHER PUBLICATIONS

European Search Report for EP Application 17306564.0 dated May 7, 2018.

*Primary Examiner* — Jessica H Lutz
(74) *Attorney, Agent, or Firm* — Thompson Coburn LLP; Steven M. Ritchey

(57) ABSTRACT

A harvesting device includes a support defining an uprooting position of the harvesting device, and an uprooting section comprising at least two uprooting units, each uprooting unit having at least one uprooting element, each uprooting unit being adapted to uproot root crop. At least one of the uprooting units is mobile with respect to the support between an active position and an inactive position, the active position being a position in which the uprooting unit is able to uproot beet crop in a field having a field surface when the harvesting device is in the uprooting position, the inactive position being a position in which the uprooting unit is unable to uproot beet crop in the field when the harvesting device is in the uprooting position.

27 Claims, 7 Drawing Sheets

(56) References Cited

U.S. PATENT DOCUMENTS

| | | | | |
|---|---|---|---|---|
| 4,185,696 | A * | 1/1980 | Williams | A01D 23/04 |
| | | | | 171/110 |
| 10,159,179 | B2 * | 12/2018 | Kemper | A01D 25/04 |
| 2012/0095654 | A1 * | 4/2012 | Miller | A01D 33/14 |
| | | | | 701/50 |
| 2017/0105337 | A1 * | 4/2017 | Ramsauer | A01D 33/00 |

* cited by examiner

HARVESTING DEVICE, CORRESPONDING MACHINE AND METHOD

CROSS-REFERENCE TO RELATED APPLICATIONS

This application claims priority to European Patent Application No. 17306564.0, filed Nov. 10, 2017, the entirety of which is hereby incorporated by reference.

STATEMENT REGARDING FEDERALLY SPONSORED RESEARCH OR DEVELOPMENT

Not Applicable.

APPENDIX

Not Applicable.

BACKGROUND

The present invention concerns a harvesting device for harvesting root crop, in particular beet crop. The harvesting device includes a support defining an uprooting position of the harvesting device and an uprooting section comprising at least two uprooting units. Each uprooting unit has at least one uprooting element, in particular the at least one uprooting element being a pair of uprooting shares. Each uprooting unit is adapted to uproot root crop. Such a harvesting device is known from US 2017/0105337.

However the known harvesting device still calls for further improvement in order to render the harvesting process more economical, in particular more energy efficient and faster.

SUMMARY

In order to solve one or more of these problems, the invention relates to a harvesting device as stated above, characterized in that at least one of the uprooting units, in particular each uprooting unit, is mobile with respect to the support between (1) an active position in which the uprooting unit is able to uproot beet crop in a field having a field surface when the harvesting device is in the uprooting position, and (2) an inactive position in which the uprooting unit is unable to uproot beet crop in the field when the harvesting device is in the uprooting position. Advantageous embodiments of the harvesting device according to the invention may include the at least one of the uprooting units. In particular, each uprooting unit is mobile between its active position and its inactive position independently from the position with respect to the support of all the other uprooting units. The harvesting device defines a harvesting plane and the offset of each uprooting unit between its active position and its inactive position, measured perpendicularly to the harvesting plane (HP) may be at least 10 cm, in particular at least 15 cm or at least 25 cm or at least 35 cm. For each of the uprooting units, when the uprooting unit is in the inactive position, the at least one uprooting element is arranged on a first side of the harvesting plane and when the uprooting unit is in the inactive position, the at least one uprooting element is arranged on a second side of the harvesting plane. In particular when the uprooting unit is in the inactive position, the uprooting unit is spaced apart from the field surface.

Advantageous embodiments of the harvesting device according to the invention may include at least one of the uprooting units, each of the uprooting unit having linking means. Preferably, the linking means includes linking bars and pivots linking the corresponding uprooting unit to the support mobile between its active position and its inactive position. The harvesting device includes, for the at least one of the uprooting units, in particular for each of the uprooting units, a drive device, in particular including a hydraulic cylinder, adapted to move the corresponding uprooting unit between its active position and its inactive position independently from the position with respect to the support of all of the other uprooting units.

Advantageous embodiments of the harvesting device according to the invention may include detection and control means adapted to move each uprooting unit between its active position and its inactive position based on information representing the presence or absence of crop to be harvested in a row treated by the uprooting unit. The detection and control means include a detection unit adapted to detect, for each of the uprooting units whether the uprooting unit is to be moved into its active position or into its inactive position, and a control unit adapted to control the movement of the uprooting units between their active and inactive position based on information provided by the detection unit and wherein the detection unit comprises an evaluation unit. The detection unit includes a memory, a sensor means, and an evaluation unit. The memory contains data representing the position of each root crop to be uprooted in the field to be treated. The sensor means generate information about the current position of each uprooting unit with respect to the field to be treated. The evaluation unit, based on the information from the memory and based on the information from the sensor means, is adapted to control the control unit. The evaluation unit controls the control unit to move the uprooting unit into its active position when the uprooting unit is positioned in the field in front of a root crop to be uprooted. The evaluation unit controls the control unit to move the uprooting unit towards or into its inactive position when the uprooting unit is positioned in the field in front of a section without root crop to be uprooted. The detection unit may include, for each uprooting unit, a sensor being adapted to detect the presence or absence of root crop to be uprooted in front of the device for harvesting root crop and being connected to the evaluation unit and an evaluation unit adapted to control the movement of each uprooting unit into its respective active or inactive position based on the detection of a presence or absence of root crop.

The invention relates also to a machine for harvesting root crop, in particular beet crop. The machine includes a head cutter unit adapted to cut off heads of root crop to be harvested and a harvesting device for harvesting root crop of which the heads have been cut by the cutting unit. The device for harvesting root crop is a device as defined above.

The invention relates also to a method for harvesting root crop using a device as defined above or a machine as defined above. The method includes detecting for the or each uprooting unit whether a root crop to be uprooted is in the soil within a predetermined distance of the uprooting unit in a harvesting travel direction of the harvesting device. The method further includes, in case a root crop to be uprooted is within the predetermined distance, moving the uprooting unit into its active position, and uprooting the root crop with the uprooting unit.

The method for harvesting root crop may include detecting for each uprooting unit whether the row of root crop currently treated comprises root crop not yet uprooted, and, in case the row of root crop currently treated does not include any more root crop, bringing the uprooting element into its inactive position. The method may be executed after a turn at an end-of-row of the harvesting device, and in particular before the beginning of a row to be uprooted.

These are merely some of the innumerable aspects of the present disclosure and should not be deemed an all-inclusive listing of the innumerable aspects associated with the present disclosure. These and other aspects will become apparent to those skilled in the art in light of the following disclosure and accompanying drawings. The description and specific examples in this summary are intended for purposes of illustration only and are not intended to limit the scope of the present disclosure.

BRIEF DESCRIPTION OF THE DRAWINGS

The accompanying drawings, which are incorporated in and form a part of the specification, illustrate the embodiments of the present disclosure and together with the description, serve to explain the principles of the disclosure.

DETAILED DESCRIPTION

Figure 1:
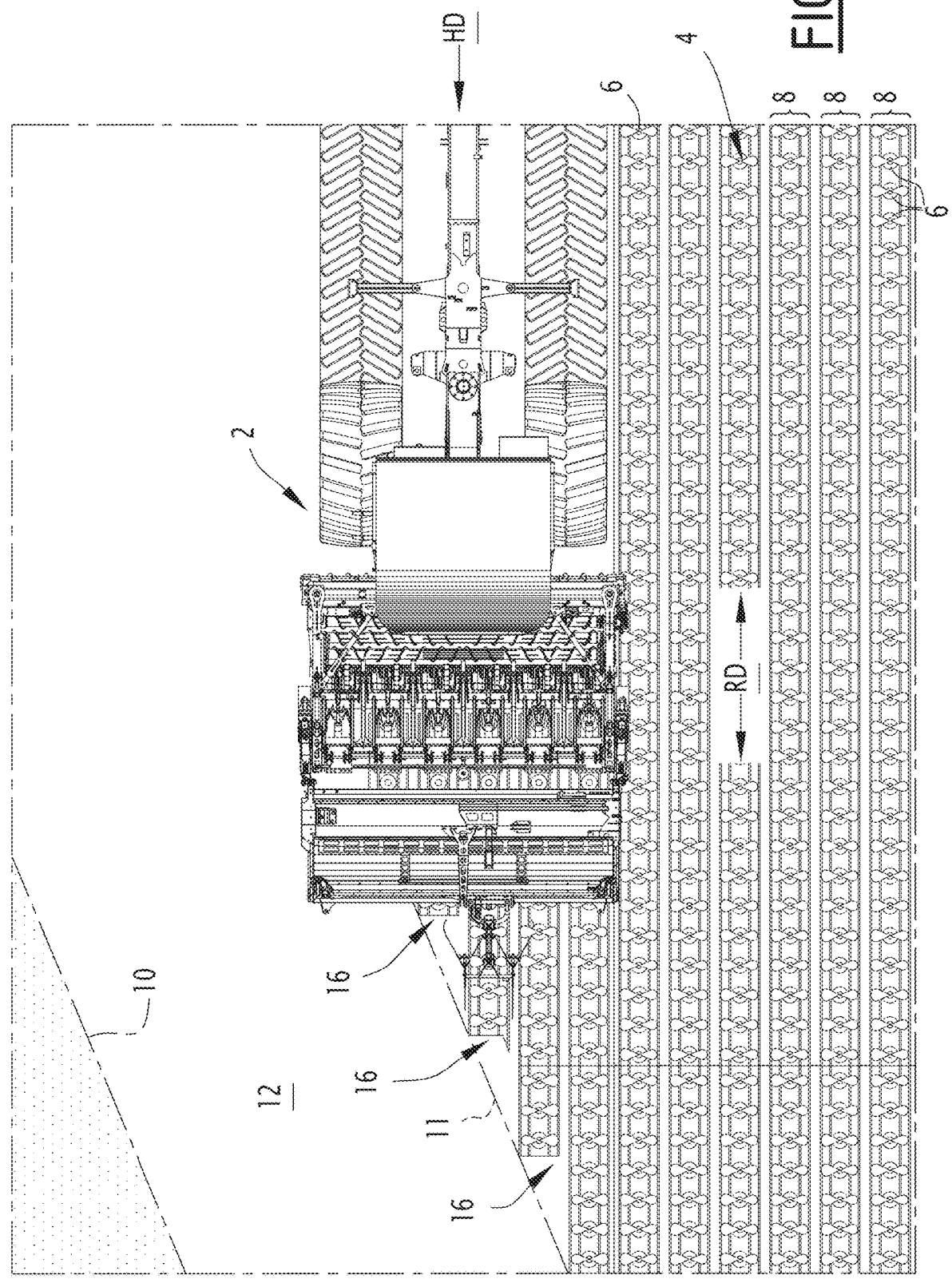
FIG. 1 is a schematic view of a field to be treated and a vehicle comprising the harvesting device according to the invention, the vehicle treating an end headland.

FIG. 1 shows a schematic view of a field to be treated and of a harvesting vehicle according to the invention designated by the general reference number 2. The field to be treated is an agricultural field 4 and comprises root crop 6, such as beet crop, and in particular sugar beets. The root crop 6 is arranged in rows 8 which are generally parallel one to another and extend along a row direction RD. The agricultural field 4 has a field limit 10 that is generally oblique with respect to the row direction RD and a plant limit 11 which can be generally parallel to the field limit 10. The field limit 10 and the plant limit 11 define between them a headland 12 in which the root crop have already been harvested or in which no root crops are planted. The headland can for example be the soil of the harvested field, a meadow, grass, or a street.

Each row 8 has a row beginning 14 (see FIG. 2) and a row end 16 (see FIG. 1). The row beginnings 14 and the row ends 16 of adjacent rows 8 are offset one with respect to another in the row direction RD in the zone of the headland 12. The row beginnings 14 and the row ends 16 define and are generally aligned with the plant limit 11 in the zone of the headland 12. In a center portion of the agricultural field 4, the row beginnings 14 and/or the row ends 16 of adjacent rows 8 may be aligned one with another in the row direction RD.

Figure 2:
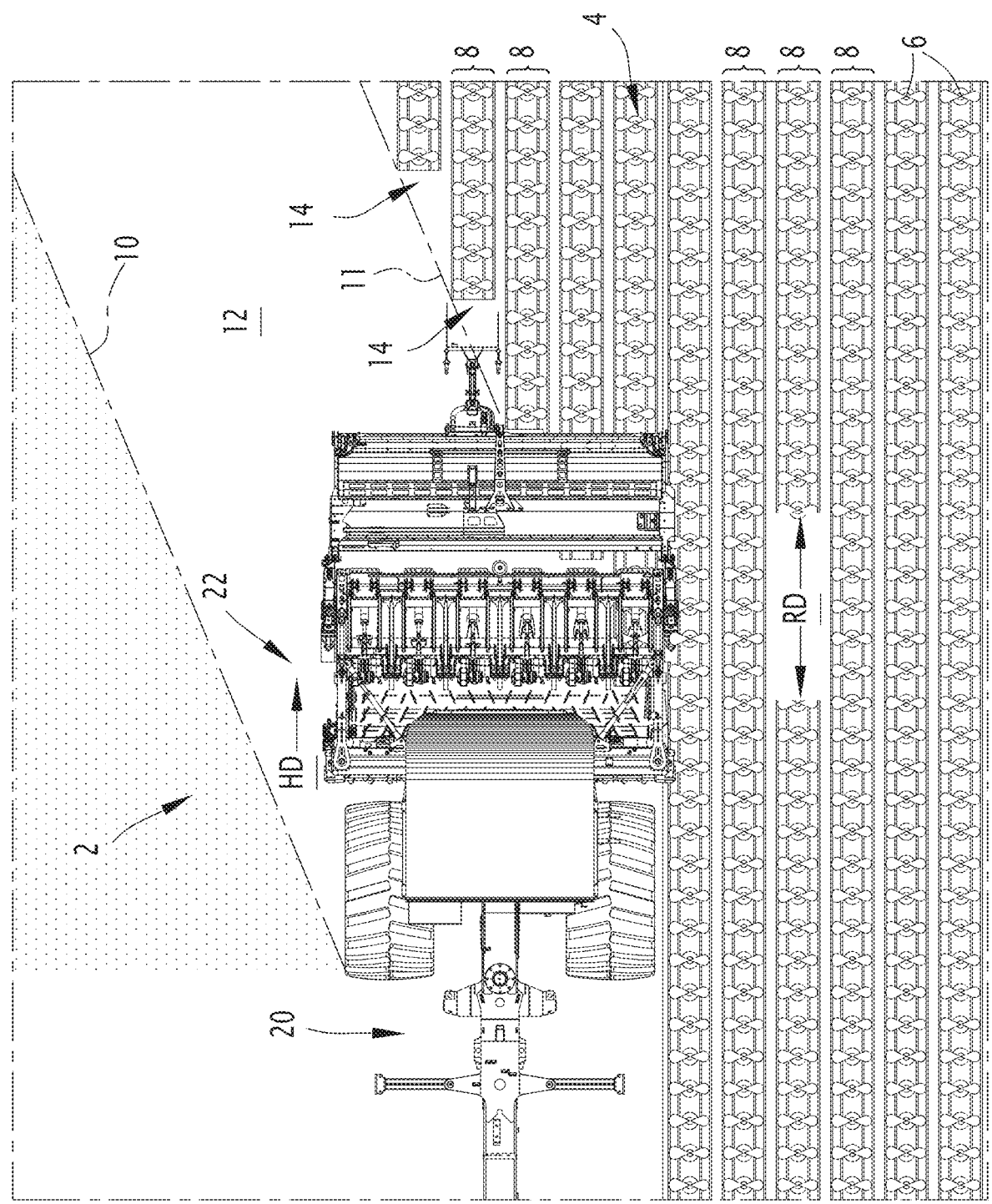
FIG. 2 is the schematic view of a field to be treated similar to FIG. 1, but the vehicle treating a beginning headland.

The agricultural field 4 defines also a field surface 18 that is generally parallel to the drawing plane of FIGS. 1 and 2.

The harvesting vehicle 2 comprises a vehicle unit 20 and a machine for harvesting root crop 22.

Figure 5:
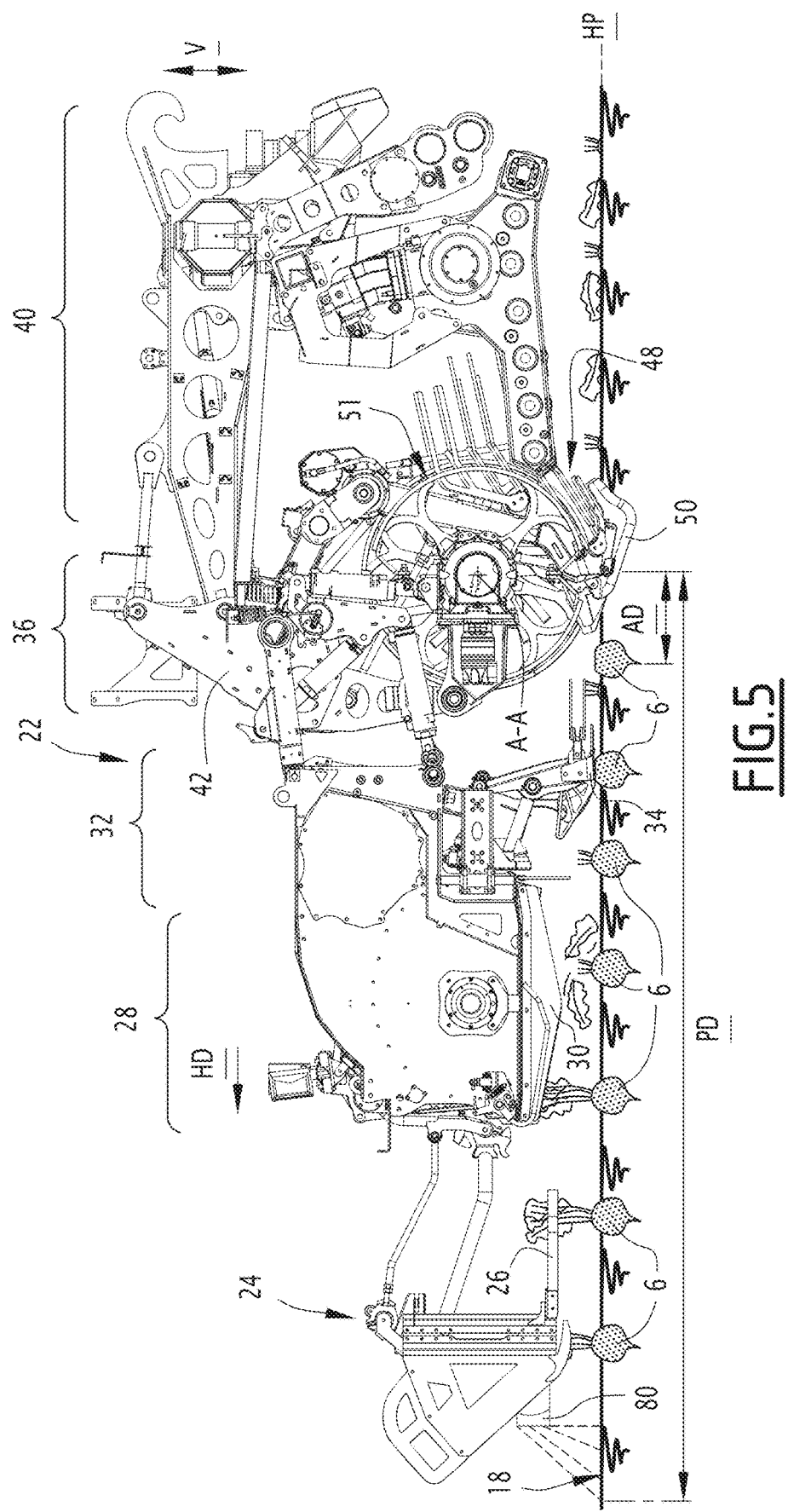
FIG. 5 is a side view of the harvesting device according to the invention during treatment of the field.

As can be seen on FIG. 5, the machine for harvesting root crop 22 comprises a foliage sensor unit 24 comprising a foliage sensor 26, a leaf cutter unit 28 comprising leaf cutters 30, a head cutter unit 32 comprising a head cutter 34, a harvesting device 36 for harvesting root crop and a cleaning and loading unit 40 adapted to clean the root crop 6 harvested by the harvesting device 36.

The harvesting device 36, and more generally the harvesting vehicle 2, defines a harvesting travel direction HD which corresponds to the travel direction of the harvesting vehicle 2 during uprooting of the root crop. The harvesting device 36, and more generally the harvesting vehicle 2, defines a harvesting plane HP, which is during the uprooting operation a plane generally parallel to the field surface 18 and parallel to the harvesting travel direction HD. The harvesting plane HP is the nominal plane at which the field surface 18 is located and with respect to which the uprooting units 48 and the remaining components of the harvesting vehicle 2 are designed and positioned. In the Figures, the harvesting plane HP coincides with the field surface 18.

The harvesting device 36 comprises a support 42, which is for example a frame, and which defines an uprooting position of the harvesting device 36. The uprooting position of the harvesting device 36 is the position in which the support 42 is with respect to the vehicle unit 20 or with respect to the agricultural field 4, in particular to the field surface 18, during uprooting of the root crop 6, that is during the action of extracting one or more root crop 6 out of the soil of the field.

The harvesting device 36 comprises also an uprooting section 46 comprising at least two uprooting units 48. In the present case, the harvesting device 36 or the uprooting section 46 comprises six uprooting units 48 which are arranged side by side.

Figure 3:
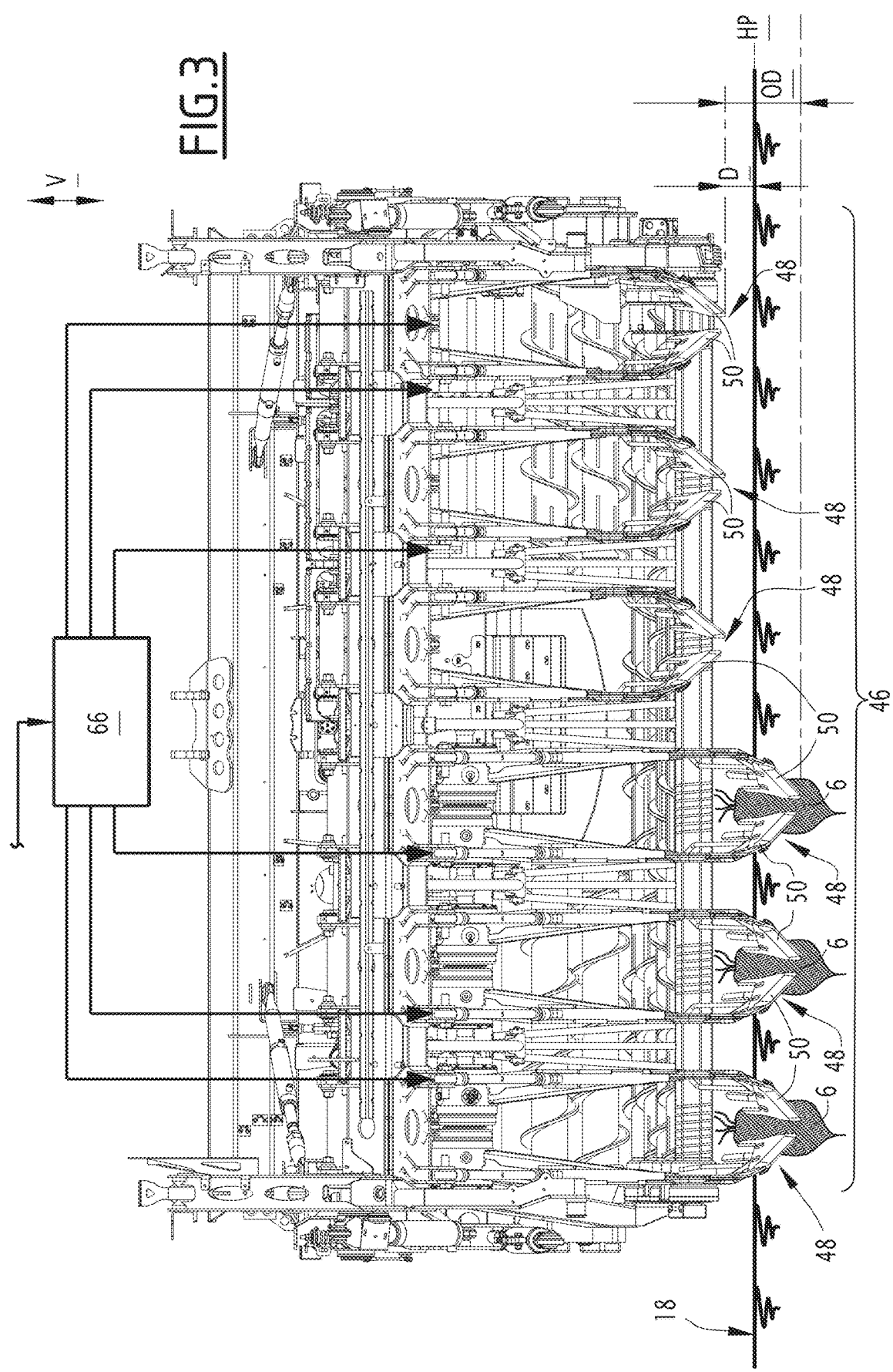
FIG. 3 is a schematic illustration of a portion of the harvesting device during treatment of the field, the view being taken in a direction parallel to a harvesting travel direction.
Figure 4:
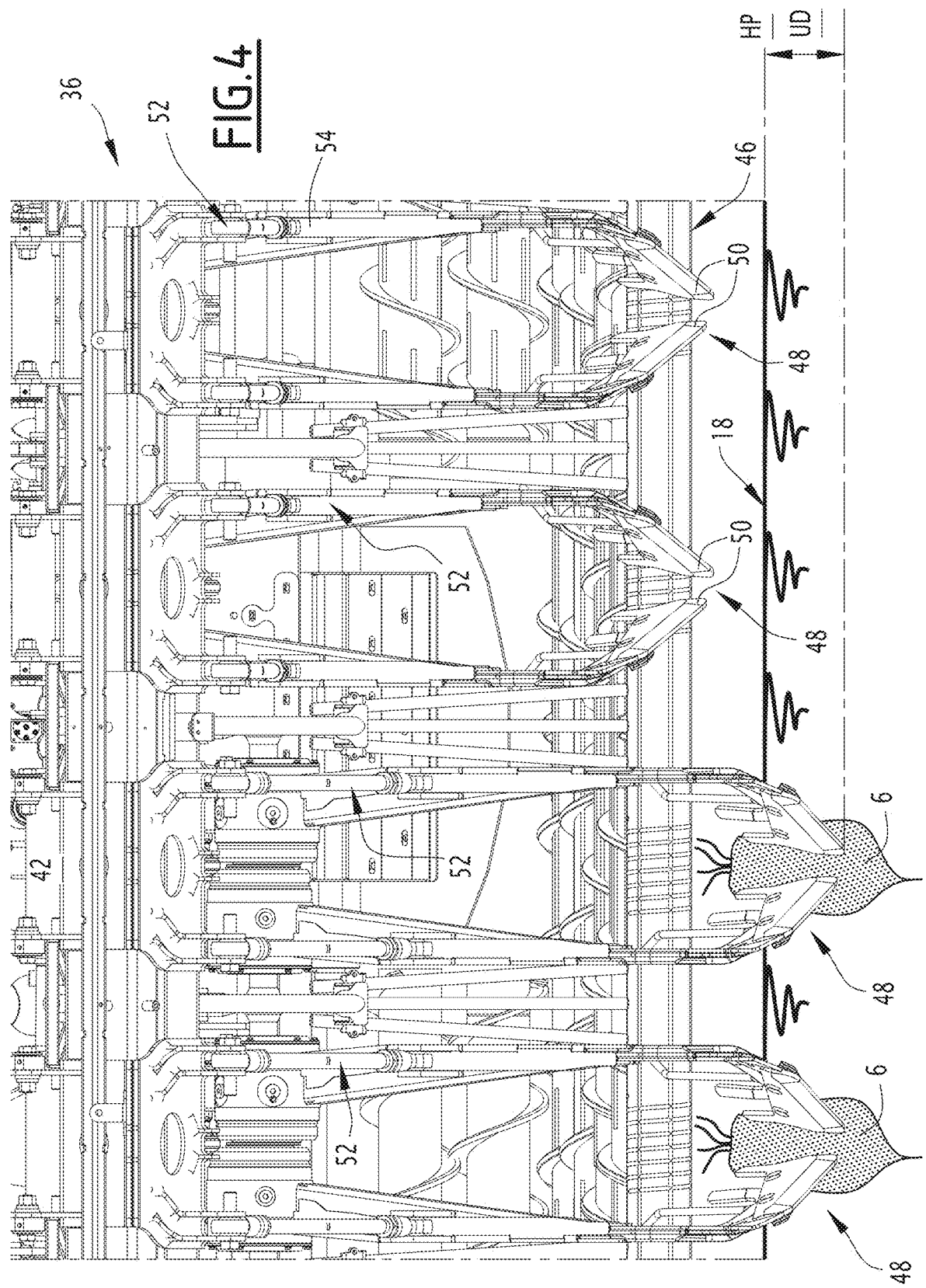
FIG. 4 is an enlarged view of a detail of FIG. 3.

Each uprooting unit 48 comprises a pair of uprooting shares 50. Each uprooting unit 48 is adapted to uproot root crop 6 by being inserted in the agricultural field 4 in a predefined uprooting depth UD (FIG. 4), which may depend on the type of root crop 6 and the geometry of the uprooting shares 50 (FIG. 3). For uprooting, the uprooting unit 48 is inserted in the agricultural field 4 by the uprooting depth UD and is translated in the harvesting travel direction HD. In other words, the uprooting depth UD is the distance of the lower tip (i.e. the point of the uprooting share farthest from the harvesting plane HD) of the uprooting shares 50 (or more generally the uprooting elements) to the harvesting plane HD. The uprooting depth UD is for example at least 5 cm, at least 15 cm or at least 30 cm. The uprooting depth can also be at most 45 cm.

At least one of the uprooting units 48, and in particular and preferably each of the uprooting units 48, is mobile with respect to the support 42 between an active position in which the uprooting unit 48 is able to uproot root crop 6 in the field 4 when the harvesting device 36 is in the uprooting position and an inactive position in which the uprooting unit 48 is unable to uproot root crop in the field when the harvesting device 36 is in the uprooting position.

On FIG. 3, the three leftmost uprooting units 48 are in their active position and the rightmost three uprooting units 48 are in their inactive position. As can be seen, in the active position, the uprooting unit 48 comes into contact with the root crop 6 of the row 8 being treated by the corresponding uprooting unit 48 and is inserted in the soil. In the inactive position, the uprooting unit 48 is retracted and generally spaced apart by a distance D, measured perpendicularly to the harvesting plane HD with respect to the field surface 18 or the harvesting plane HD. In this position, the uprooting unit 48 is out of contact with the agricultural field 4. The distance D is more particularly measured from the lower tip (i.e. the point of the uprooting share closest to the harvesting plane) of the uprooting shares 50 to the harvesting plane HD. The distance D is generally greater than 0 and is preferably greater than 6 cm, more preferably greater than 8 cm or greater or equal to 10 cm.

The distance D is generally smaller than 16 cm, preferably smaller than 14 cm and more preferably smaller or equal to 12 cm.

The uprooting unit 48 in its inactive position, is offset a distance OD with respect to the active position and along a vertical direction V or along a direction perpendicular to the harvesting plane HP. The offset distance of the uprooting unit 48 between its active position and its inactive position, measured perpendicularly to the harvesting plane HP, is generally at least 10 cm, in particular 15 cm, an may be at least 25 cm or at least 35 cm.

The uprooting elements, in the present embodiment the uprooting shares 50, are, when the uprooting unit 48 is in the inactive position, arranged on a first side of the harvesting plane (HP) and when the uprooting unit 48 is in the inactive position, arranged on a second side, opposite the first side, of the harvesting plane (HP).

Alternatively, when the uprooting unit 48 is in the inactive position, the uprooting elements 50 are arranged on the second side of the harvesting plane (HP). In this case the uprooting elements 50, in the inactive position are still in the field (i.e. below the field surface), but need less force to be displaced and have less wear. In this case, the offset distance OD is smaller than the uprooting distance UD.

At least one of the uprooting units 48 is mobile between its active position and its inactive position independently from the position with respect to the support 42 or with respect to all of the other uprooting units 48. In the present example, each and all of the uprooting units 48 is mobile between its active position and its inactive position independently from the position with respect to the support 42 or with respect to all of the other uprooting units 48. In this manner, at any given moment during treating a field, only the uprooting units 48 that are not needed for uprooting a root crop in the field can be and are put into their inactive position, while all the uprooting units 48 that are needed for uprooting root crop 6 can be left and are inserted in the soil.

This allows for low energy consumption for a given uprooting speed, as the uprooting units 48 in their inactive position do not create a reaction force to be overcome by the vehicle 2. Also, the uprooting units in their inactive position are not subject to wear from the soil and the harvesting operation is faster and more economical as downtime due to worn uprooting units is reduced.

The harvesting device 36 comprises also at least one, in particular two guide wheels 51, having an axis of rotation A-A transversal to the harvesting travel direction HD. During uprooting, the axis of rotation A-A is generally horizontal. The guide wheels 51 are arranged on each lateral side of the harvesting device 36. The harvesting plane HP extends tangentially to the circumference of the support wheel(s). The harvesting plane HP is generally a nominal field surface with respect to which the position of the uprooting units 48 is designed.

Figure 6:
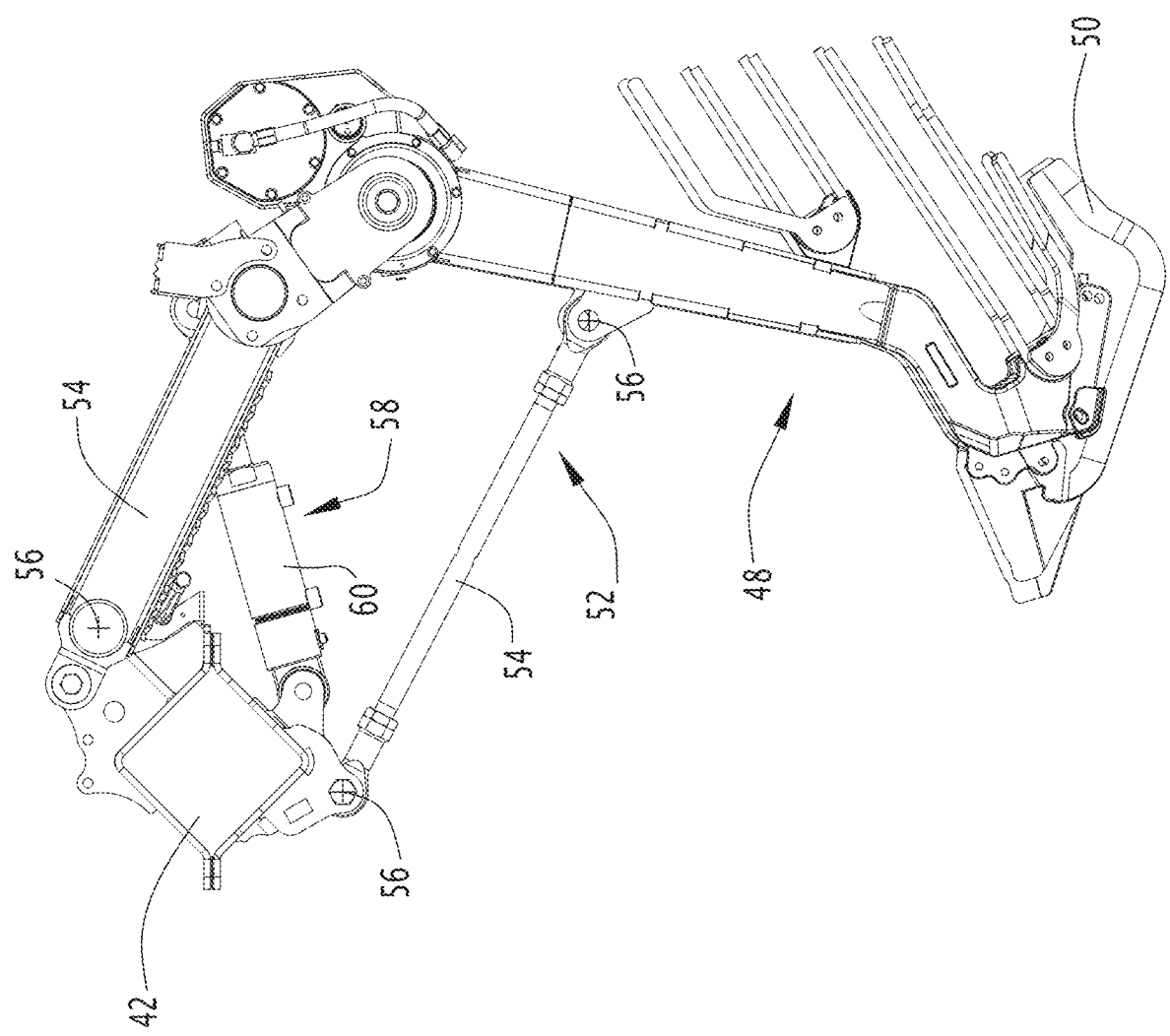
FIG. 6 is a lateral view of an uprooting unit of the harvesting device according to the invention.
Figure 7:
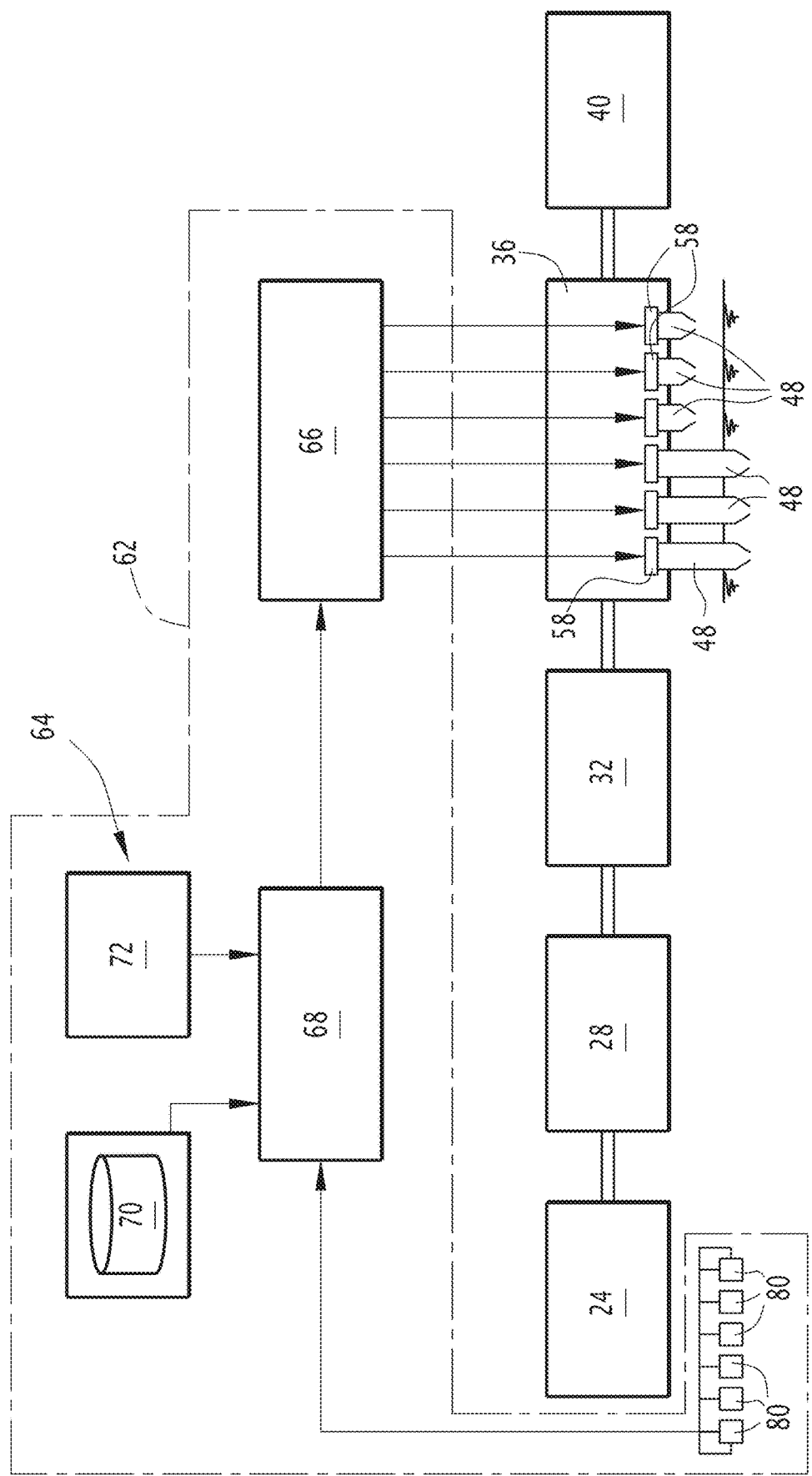
FIG. 7 is a schematic block diagram of the harvesting device according to the invention Reference characters in the written specification indicate corresponding items shown throughout the drawing figures.

In order to render the uprooting units 48 mobile with respect to the support 42, the harvesting device 36 comprises, for each uprooting unit 48, linking means 52 linking the corresponding uprooting unit 48 to the support 42 mobile between the active position and the inactive position (see FIG. 6).

The linking means 52 comprise for example a set of linking bars 54 attached on the one end to the support 42 and on the other end to the uprooting unit 48 via pivots 56.

The harvesting device 36 comprises, for each uprooting unit 48, a drive device 58 adapted to move the uprooting unit 48 between its active position and its inactive position and this independently from the position with respect to the support 42 of all the other uprooting units 48. In case not all of the uprooting units 48 are individually mobile between the active and inactive position, only for the mobile uprooting units a drive device is present.

The drive device 58 (FIG. 6) comprises for example a hydraulic cylinder 60. One end of the hydraulic cylinder 60 is attached to the support 42 and the other end of the hydraulic cylinder 60 is attached to the uprooting unit 48, respectively the linking means 52, so that an extension and/or retraction of the hydraulic cylinder moves the uprooting unit 48 between its active and inactive positions.

The harvesting device 36 comprises also control means 62 adapted to move the or each uprooting unit 48 between its active position and its inactive position, based on information representing the presence or absence of root crop to be harvested in a row 8 currently treated by the uprooting unit 48. The control means 62 comprise a detection unit 64 adapted to detect for the or each uprooting unit 48 whether a root crop to be uprooted is in the soil of the currently treated row 8 of the respective uprooting unit 48 or whether a root crop 6 to be uprooted is in the soil within a predetermined distance PD of the uprooting unit 48 in the harvesting travel direction HD of the harvesting device.

The control means comprise also a control unit 66 adapted and configured to drive the drive device 58 of each uprooting unit 48 based on information by the detection unit 64.

The detection unit 64 comprises an evaluation unit 68 and a memory 70 containing data representing the position of the or each root crop 6 to be uprooted in the field to be treated as well as sensor means 72 generating information about the current position of the or each uprooting unit 48 with respect to the field to be treated.

The data representing the position of the or each root crop 6 to be uprooted in the field to be treated can for example stem from data created during planting of the root crop 6, in case the root crop planting device is equipped with a device adapted to detect and store the location of each planted root crop 6. The data representing the position of the or each root crop 6 to be uprooted in the field to be treated can also stem from root crop locating means comprising an image recognition means adapted to extract the location data from an image of the field to be treated.

The sensor means 72 comprise for example a GPS or other position and heading generating device and a memory containing information about the geometry of the machine for harvesting root crop 22 and the position of the uprooting units with respect to a reference point of the GPS or other position and heading generating device.

The evaluation unit 68 is adapted and configured to, based on the information from the memory 70 and based on the information from the sensor means 72, to control the control unit 66 so as to move the uprooting unit 48 or each uprooting unit 48 into its active position when the uprooting unit 48 is positioned in the field 4 in front of a root crop 6 to be uprooted, taken in the harvesting travel direction HD and preferably outside or equal to an activation distance AD (FIG. 5) which is the distance the machine for harvesting 22 traverses in the time the uprooting unit 48 takes to reach its active position from the inactive position. The activation distance AD depends on the travel or harvesting speed of the harvesting vehicle 2 and the speed with which the uprooting unit 48 is brought from the inactive position to its active position. The activation distance AD is for example comprised between 10 cm and 50 cm.

The evaluation unit 68 is also adapted to control the control unit 66 so as to move the uprooting unit 48 or each uprooting unit 48 towards or into its inactive position when the uprooting unit 48 is positioned in the field to be treated in the harvesting direction in front of a section without root crop 6 to be uprooted, and this within a minimum crop free distance, which is predetermined and which is at least two times the activation distance AD.

Additionally or alternatively to the memory 70 and the sensor means 72, the detection unit 64 can comprise for the or each uprooting unit 48 a sensor 80 fixed to a portion of the harvesting device 36, in particular to the support 42, and more particularly to the leaf cutter unit 28 or the foliage sensor unit 24. Each sensor 80 is adapted to detect the presence or absence of root crop 6 to be uprooted in front of the machine for harvesting root crop 22 and is connected to the evaluation unit 68. The sensor 80 can be for example an ultrasonic sensor, a laser sensor or a video camera connected to image recognition means. The sensor 80 can also be a mechanical sensor, for example a head sensor of the head cutter unit 32, preferably attached to the head cutter 34. The evaluation unit 68 is adapted to control the movement of the uprooting unit 48 in their respective active or inactive position based on the detection of a presence or absence of root crop 6.

During use of the harvesting device 36, the following steps are executed.

It is detected by the evaluation unit 68 for the or each uprooting unit 48, whether root crop 6 to be uprooted is in the soil of the field 4 within a predetermined distance PD of the uprooting unit 48 in the harvesting travel direction HD of the harvesting device 36. In case a root crop to be uprooted is within the predetermined distance PD, the uprooting unit 48 is moved into its active position and the root crop 6 is uprooted with the uprooting unit.

The predetermined distance PD is for example comprised between 30 cm and 3 m.

The method comprises also the step of detecting for the or each uprooting unit 48 whether the row 8 of root crop currently treated by the uprooting unit 48 comprises root crop not yet uprooted and, in case the row 8 of root crop currently treated does not comprise anymore root crop, bringing the uprooting unit into its inactive position. The method can be executed after a turn of the machine for harvesting at an end of row and/or before the beginning of a row after a turn.

Furthermore, the method can comprise the step of, after the end of a current row and before the beginning of uprooting of a new row, determining, based on information about the end of the current row, the beginning of a new row and bringing each uprooting unit 48 in the uprooting position based on the information of the current row.

In view of the foregoing, it will be seen that the several advantages of the disclosure are achieved and attained.

The embodiments were chosen and described in order to best explain the principles of the disclosure and its practical application to thereby enable others skilled in the art to best utilize the disclosure in various embodiments and with various modifications as are suited to the particular use contemplated.

As various modifications could be made in the constructions and methods herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

What is claimed is:

1. A harvesting device for harvesting root crop, the harvesting device comprising:
    a support defining an uprooting position of the harvesting device; and
    an uprooting section comprising at least two uprooting units, each uprooting unit having at least one uprooting element, each uprooting unit being adapted to uproot root crop;
    wherein at least one of the uprooting units is mobile with respect to the support between an active position and an inactive position, the active position being a position in which the uprooting unit is able to uproot beet crop in a field having a field surface when the harvesting device is in the uprooting position, the inactive position being a position in which the uprooting unit is unable to uproot beet crop in the field when the harvesting device is in the uprooting position.

2. The device according to claim 1, wherein the harvesting device is adapted and configured for harvesting beet crop.

3. The device according to claim 1, wherein the at least one uprooting element is a pair of uprooting shares.

4. The device according to claim 1, wherein each uprooting unit is mobile with respect to the support between an active position in which the uprooting unit is able to uproot beet crop in a field having a field surface when the harvesting device is in the uprooting position, and an inactive position in which the uprooting unit is unable to uproot beet crop in the field when the harvesting device is in the uprooting position.

5. The device according to claim 1, wherein at least one of the uprooting units is mobile between its active position and its inactive position independently from the position with respect to the support of all the other uprooting units.

6. The device according to claim 1, wherein the harvesting device defines a harvesting plane and wherein an offset of each uprooting unit between its active position and its inactive position, measured perpendicularly to the harvesting plane, is at least 10 cm.

7. The device according to claim 6, wherein the offset is at least 15 cm.

8. The device according to claim 7, wherein the offset is at least 25 cm.

9. The device according to claim 8, wherein the offset is at least 35 cm.

10. The device according to claim 6, wherein, for at least one of the uprooting units, when the uprooting unit is in the inactive position, the at least one uprooting element is arranged on a first side of the harvesting plane and when the uprooting unit is in the inactive position, the at least one uprooting element is arranged on a second side of the harvesting plane.

11. The device according to claim 10, wherein, when the at least one of the uprooting units is in the inactive position, the uprooting unit is spaced apart from the field surface.

12. The device according to claim 1, wherein the harvesting device comprises, for at least one of the uprooting units, linking means linking the corresponding uprooting unit to the support, mobile between its active position and its inactive position.

13. The device according to claim 12, wherein the harvesting device comprises, for each of the uprooting units, linking means, linking the corresponding uprooting unit to the support, mobile between its active position and its inactive position.

14. The device according to claim 12, wherein the linking means comprise linking bars and pivots.

15. The device according to claim 1, wherein the harvesting device comprises, for at least one of the uprooting units, a drive device adapted to move the corresponding uprooting unit between its active position and its inactive position independently from the position with respect to the support of all of the other uprooting units.

16. The device according to claim 15, wherein the harvesting device comprises, for each of the uprooting units, a drive device adapted to move the corresponding uprooting unit between its active position and its inactive position independently from the position with respect to the support of all of the other uprooting units.

17. The device according to claim 15, wherein the drive device comprises a hydraulic cylinder.

18. The device according to claim 1, wherein the harvesting device comprises detection and control means adapted to move at least one uprooting unit between its active position and its inactive position based on information representing the presence or absence of crop to be harvested in a row treated by the uprooting unit.

19. The device according to claim 18, wherein the detection and control means comprise:
   a detection unit adapted to detect, for at least one of the uprooting units whether the uprooting unit is to be moved into its active position or into its inactive position; and
   a control unit adapted to control the movement of the at least one uprooting units between their active and inactive position based on information provided by the detection unit, and wherein the detection unit comprises an evaluation unit.

20. The device according to claim 19, wherein the detection unit comprises:
   a memory containing data representing the position of root crop to be uprooted in the field to be treated; and
   sensor means for generating information about the current position of the at least one of the uprooting units with respect to the field to be treated; and
   wherein the evaluation unit, based on the information from the memory and based on the information from the sensor means, is adapted to control the at least one of the uprooting units so as to move the at least one of the uprooting units into its active position when the uprooting unit is positioned in the field in front of a root crop to be uprooted, and move the at least one of the uprooting units towards or into its inactive position when the uprooting unit is positioned in the field in front of a section without root crop to be uprooted.

21. The device according to claim 19, wherein the detection unit comprises, for at least one of the uprooting unit, a sensor being adapted to detect the presence or absence of root crop to be uprooted in front of the device for harvesting root crop and being connected to the evaluation unit, and wherein the evaluation unit is adapted to control the movement of the at least one of the uprooting units into its respective active or inactive position based on the detection of a presence or absence of root crop.

22. The device according to claim 1, wherein the at least one uprooting element comprises a head cutter unit adapted to cut off heads of root crop to be harvested, the harvesting device being adapted and configured for harvesting root crop of which the heads have been cut by the cutting unit.

23. A method for harvesting root crop using a device according to claim 1 comprising the steps of:
   detecting for the at least one of the uprooting units whether a root crop to be uprooted is in soil within a predetermined distance of the at least one of the uprooting units in a harvesting travel direction of the harvesting device; and
   in case a root crop to be uprooted is within the predetermined distance, moving the uprooting unit into its active position, and uprooting the root crop with the uprooting unit.

24. The method for harvesting root crop according to claim 23, comprising the step of detecting for the at least one of the uprooting units whether a row of root crop currently treated comprises root crop not yet uprooted and in case the row of root crop currently treated does not comprise any more root crop, bringing the uprooting element into its inactive position.

25. The method according to claim 23, wherein the steps are executed after a turn at an end-of-row of the harvesting device.

26. The method according to claim 23, wherein the steps are executed before the beginning of a row to be uprooted.

27. The device according to claim 1, wherein each uprooting unit is mobile between its active position and its inactive position independently from the position with respect to the support of all the other uprooting units.

* * * * *